H. E. DODGE.
APPARATUS FOR CONSTRUCTING MONOLITHIC BUILDINGS.
APPLICATION FILED AUG. 3, 1918.

1,332,617.

Patented Mar. 2, 1920.
7 SHEETS—SHEET 3.

UNITED STATES PATENT OFFICE.

HARVEY E. DODGE, OF SOUTH ORANGE, NEW JERSEY, ASSIGNOR TO CHARLES H. INGERSOLL, OF SOUTH ORANGE, NEW JERSEY.

APPARATUS FOR CONSTRUCTING MONOLITHIC BUILDINGS.

1,332,617.   Specification of Letters Patent.   Patented Mar. 2, 1920.

Application filed August 3, 1918. Serial No. 248,153.

*To all whom it may concern:*

Be it known that I, HARVEY E. DODGE, a citizen of the United States, and resident of South Orange, county of Essex, State of New Jersey, have invented certain new and useful Improvements in Apparatus for Constructing Monolithic Buildings, of which the following is a specification.

My invention relates to apparatus or molds for the construction of buildings of concrete or other coalescent material and has for its primary object the provision of a knock-down apparatus or mold which may be assembled in a simple and expeditious manner to receive the concrete or other coalescent material for casting a building complete at a single operation, including floors, ceilings, partitions, roof and any other details which it is desired to incorporate in the finished structure. My invention further proposes a construction in which the strains and stresses resulting from the masses of coalescent material, during and after pouring, are not transmitted to the walls of the molds but, on the contrary, are taken up and absorbed by the major supporting means comprising part of my invention, and in which deviation from the predetermined results in any manner, are obviated or at least reduced to a minimum. A further object of my invention is the provision of an apparatus in which all parts are standardized, so that said apparatus may be successively utilized for the casting of any number of buildings of a given type or style of architecture.

Other objects of my invention will appear from the description hereinafter and the features of novelty will be pointed out in the appended claims.

In the accompanying drawings, which for illustrative and descriptive purposes show an example of my invention.

Figure 2:
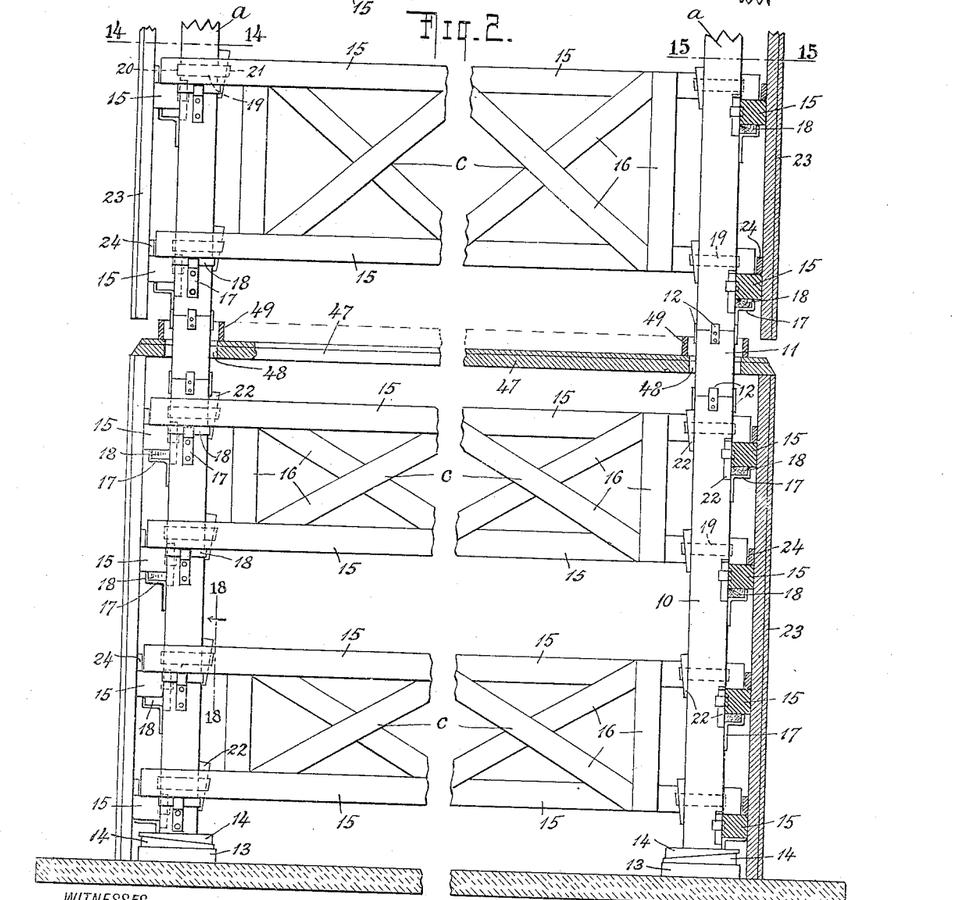
Fig. 2 is a detail vertical section on an enlarged scale.
Figure 3:
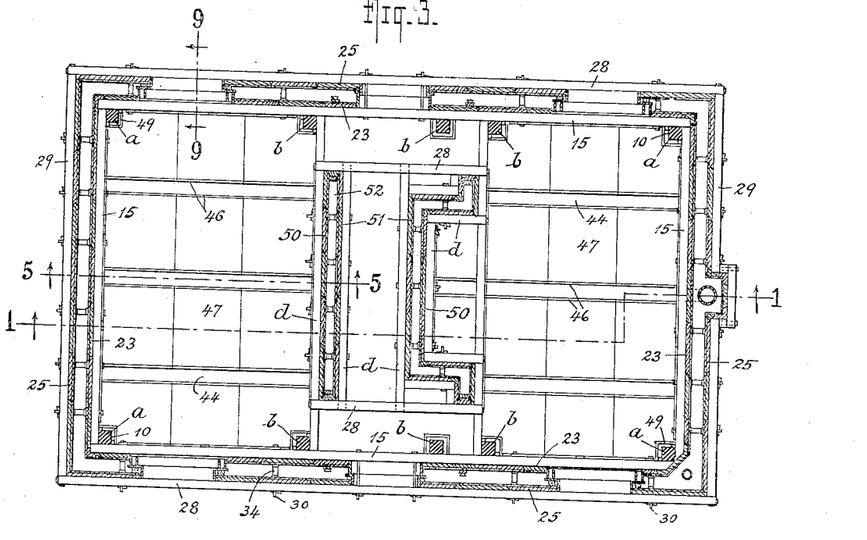
Fig. 3 is a horizontal section on the line 3—3 of Fig. 1.
Figure 4:
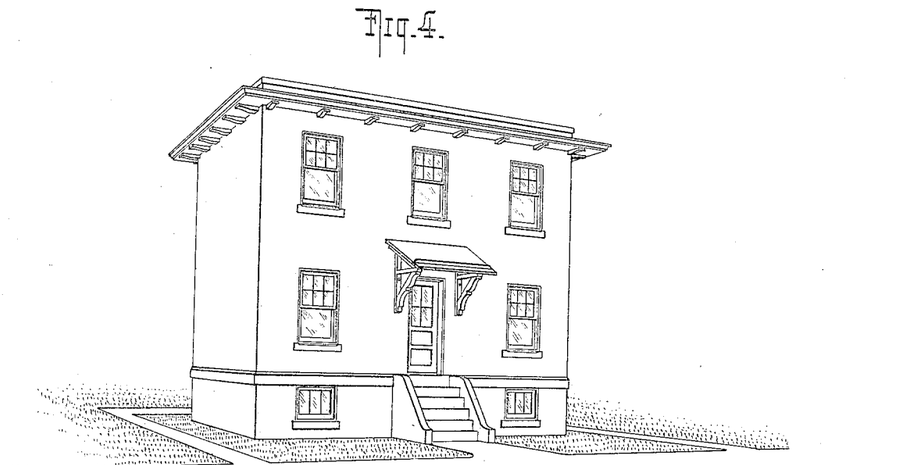
Fig. 4 is a perspective view of a building constructed according to my invention.

My improved apparatus comprises main supporting means consisting of truss-connected uprights, said uprights being suitably disposed with respect to the shape and type of the building under construction and on which the other elements of the apparatus are supported. In the illustrated example, the uprights, usually wooden timbers of suitable dimensions, comprise relatively longer sections 10 and relatively shorter sections 11 resting upon each other in end to end relation and built up to the height required for the particular building in question. The sections 10 and 11 are maintained in proper vertical alinement with each other in any suitable manner, as, for instance, by means of lugs 12 secured to one section and extending across the joint into engagement with the next adjacent section, as shown in Fig. 2. The sections are so proportioned in length, with respect to the building for which they are intended, as to locate the short sections 11 at approximately the level of the floors of said building, this arrangement facilitating the removal of the uprights from the finished structure as will be more fully described hereinafter. The uprights rest upon blocks 13 which in turn are properly positioned either upon previously laid individual column footings, or upon a footing comprising the floor of the subsequent cellar, a pair of wedges 14 being in any case preferably located between the lower end of each lowermost section 10 and the coöperating block 13, in opposed relation to each other as shown in Fig. 2; the wedges serve not only to properly position the uprights, but also to facilitate their removal when the apparatus is finally knocked down.

In the illustrated example four uprights, indicated for convenience of description as $a$, are located at the angles or corners of a rectangle defining the interior form of the building, while additional intermediate uprights $b$ are located at suitable points between the uprights $a$.

Figures 17, 18, 19:
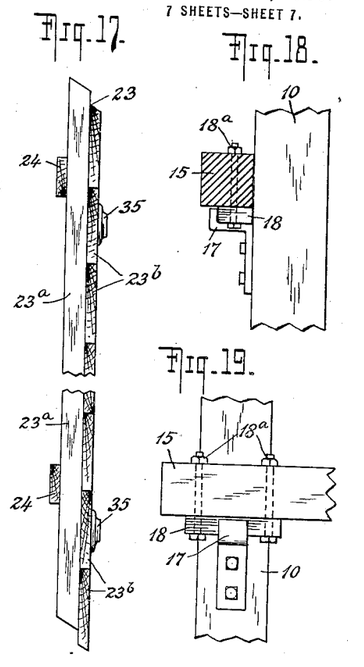
Fig. 17 is an edge elevation thereof.
Fig. 18 is a detail section on the line 18—18 of Fig. 2.
Fig. 19 is an elevation thereof.

My apparatus further includes main trusses $c$, each consisting of laterals 15 disposed in spaced and parallel relation to each other and connected together by cross-pieces 16 to form a rigid unit. These main trusses $c$ are supported upon angle rests or hooks 17 located in spaced relation lengthwise of the uprights $a$ and $b$ as shown best in Fig. 2; in the preferred arrangement the angle rests or hooks 17 are located entirely beneath the laterals 15 which are provided at proper intervals with blocks or the like 18 secured in position in any suitable manner, as by means of bolts 18$^a$ and arranged to rest in said hooks 17, as shown in Figs. 18 and 19. With this construction projections are avoided on the outer faces of the truss members 15 and the trusses are maintained in their intended positions, against lateral movement relatively to the uprights $a$ and $b$.

Figure 1:
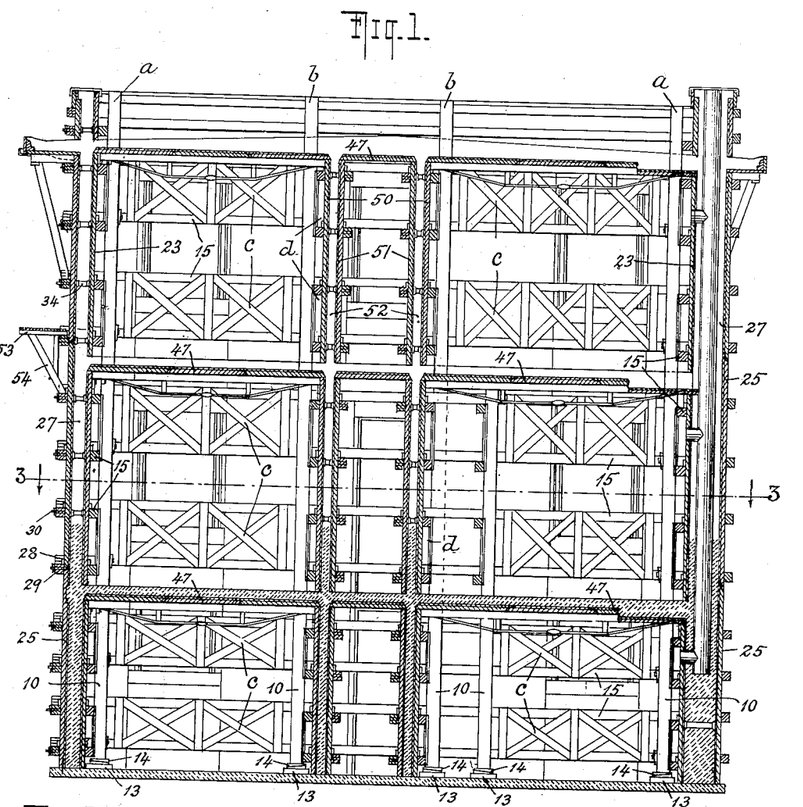
Figure 1 is a vertical section on the line 1—1 of Fig. 3 showing my apparatus set up for use.

With the described arrangement the trusses $c$ are carried upon the uprights $a$ and $b$ in spaced parallel relation to each other as shown in Figs. 1 and 2, and in addition to their other functions to be described hereinafter serve to tie the uprights $a$ and $b$ together. In addition to being held against lateral movement relatively to the uprights $a$ and $b$ by the hooks 17 and blocks 18, the trusses $c$ are preferably further held against movement in the direction of their length relatively to the uprights $a$ and $b$; for this purpose the truss laterals 15 may be provided with devices 19 having end members 20 arranged to engage the uprights $a$ and $b$ and opposite end members 21 spaced therefrom in the assembled condition of the parts. Instead of having the devices 19 arranged parallel to the laterals 15 with the end members 21 arranged at an angle corresponding to the inclination of the coöperating wedges 22 as shown in Fig. 2, the arrangement shown in Fig. 21 may be substituted. In this form the devices 19$^a$ are inclined with respect to the laterals so that the end members 21$^a$ are inclined at an angle corresponding to the inclination of the wedge 22; in this case the end members 20$^a$ are positioned with respect to the devices 19$^a$ to properly engage the uprights $a$ and $b$ in the same manner as do the members 20. Suitable wedges 22 are driven between the uprights $a$ and $b$ and the end members 21 of the devices 19 or the end members 21$^a$ as shown in Figs. 1, 2, 12 and 21 and serve to draw the end members 20 or 20$^a$ into firm engagement with the uprights $a$ and $b$ whereby the trusses $c$ are securely clamped thereto against relative lengthwise movement, thus increasing the rigidity of the entire structure. With the arrangement described above, the uprights $a$ and $b$ and the trusses $c$ together form a rigid truss structure, supported on short supports which carry the entire load of the truss composed of the uprights $a$ and $b$ and the trusses $c$. These short supports for the lower floors are the blocks 13 and wedges 14, while for the upper floors the supports are the short sections 11. Except for these short supporting members the entire structure is composed of truss-work.

In the preferred arrangement the angle rests or hooks 17 are located upon the uprights $a$ and $b$ so as to engage and coöperate in the indicated manner with each truss lateral 15 of a given truss to support it in position; the danger of unintentional displacement of the trusses is in this way obviated as will be clearly apparent.

Figures 9, 10, 11:
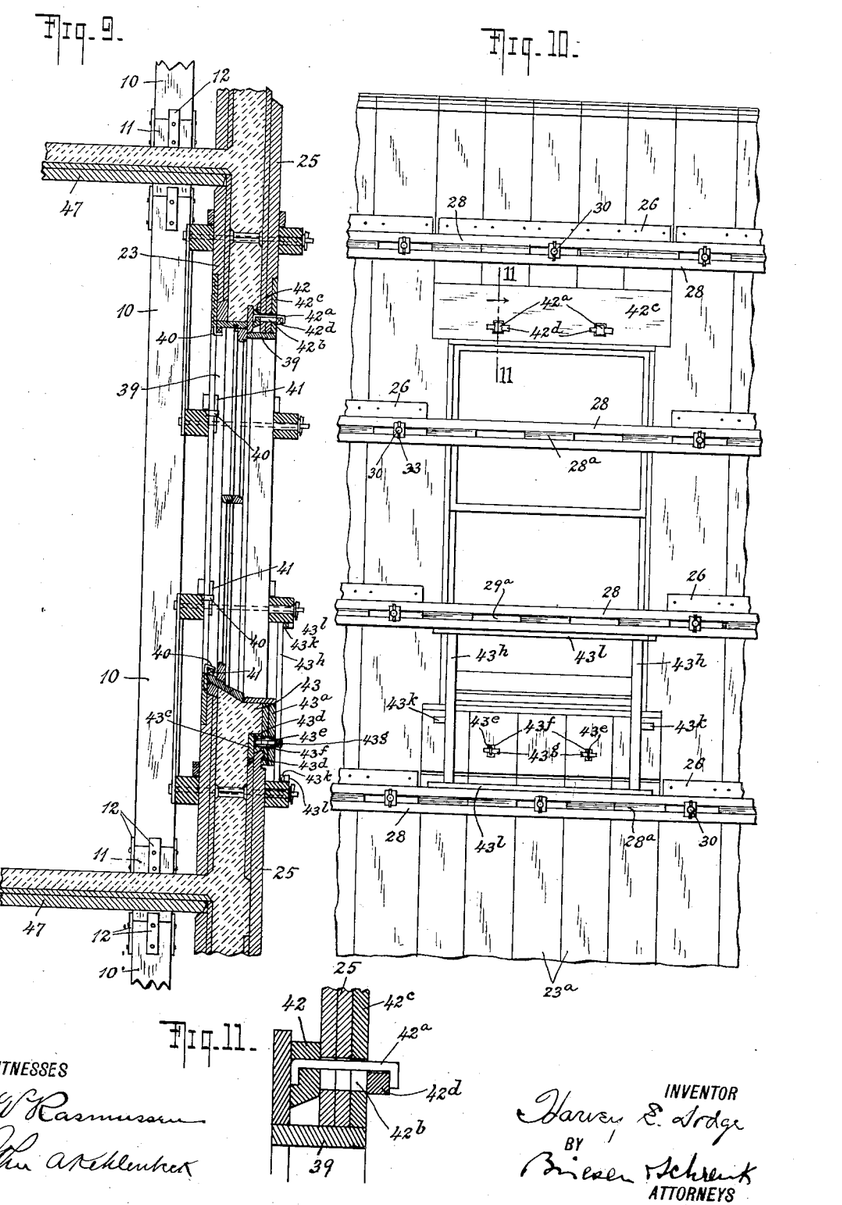
Fig. 9 is an enlarged sectional view on the line 9—9 of Fig. 3.
Fig. 10 is an outside elevation thereof.
Fig. 11 is a detail section on the line 11—11 of Fig. 10.
Figure 12:
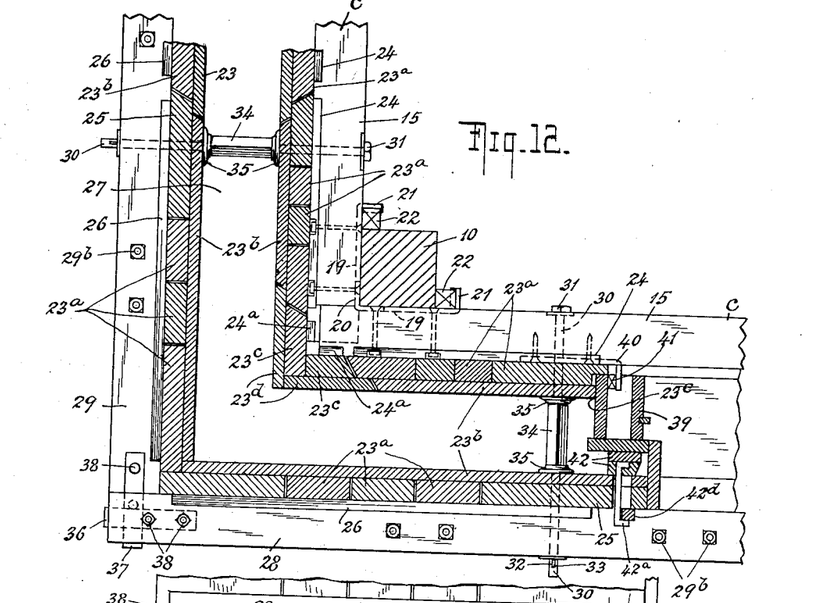
Fig. 12 is a horizontal section illustrating an example of the arrangement at the corners of my apparatus.
Figure 16:
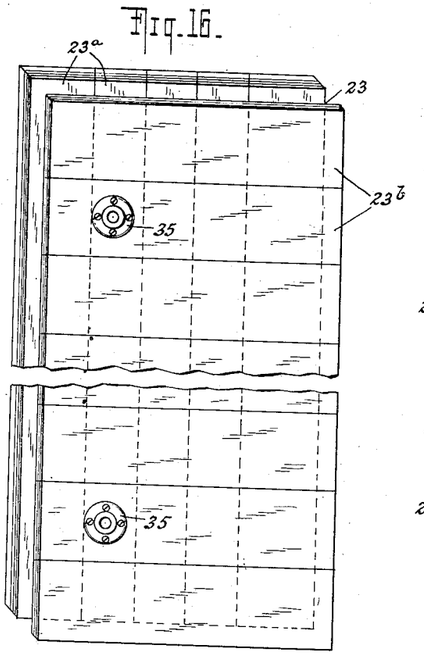
Fig. 16 is a perspective view of one of the mold forms.

In addition to the elements so far described, the apparatus includes inner mold forms 23 which as shown in Figs. 16 and 17 of the illustrated example may be in the nature of panels consisting of a plurality of parallel outer boards 23$^a$ connected together by means of a series of inner boards 23$^b$, the latter extending transversely of the boards 23$^a$ in edge to edge engagement with each other to form the active molding surfaces of the forms. The forms 23 are so arranged that the boards 23$^b$ of one panel terminate at a distance inwardly from its periphery, while the boards 23$^b$ of the next adjacent panel extend a corresponding distance beyond its periphery. With this arrangement the boards 23$^b$ of one panel overlap the adjacent panel and form a lap joint as shown in Figs. 2 and 9; thus, even though adjacent panels do not closely engage each other and even if the boards 23$^b$ of adjacent panels do not contact at their opposed edges, an efficient seal against leakage is produced owing to the fact that the overlapping boards 23$^b$ of one panel are in close surface engagement with the edge portions of the boards 23$^a$ of the adjacent panels as shown in Fig. 12. The mold forms 23 may also be provided, on the outer surfaces of the boards 23$^a$, with projections 24 which preferably extend across the same and may either comprise integral portions thereof or consist of separate members suitably secured in position. In the assembled condition of the parts the forms 23 are located in surface engagement with the trusses $c$ and are hung or supported thereon in any suitable manner, for instance, by resting the projections 24 upon the upper laterals 15 of the trusses whereby the forms 23 are suspended in position, similar devices being used if individual boards are utilized. The outer mold forms 25, which may be similar to the inner forms 23 and which may be similarly constructed and provided with projections 26 similar to the projections 24 are located opposite to and spaced from the inner forms 23 to form the molding space 27 in which the walls of the building are cast.

Figure 13:
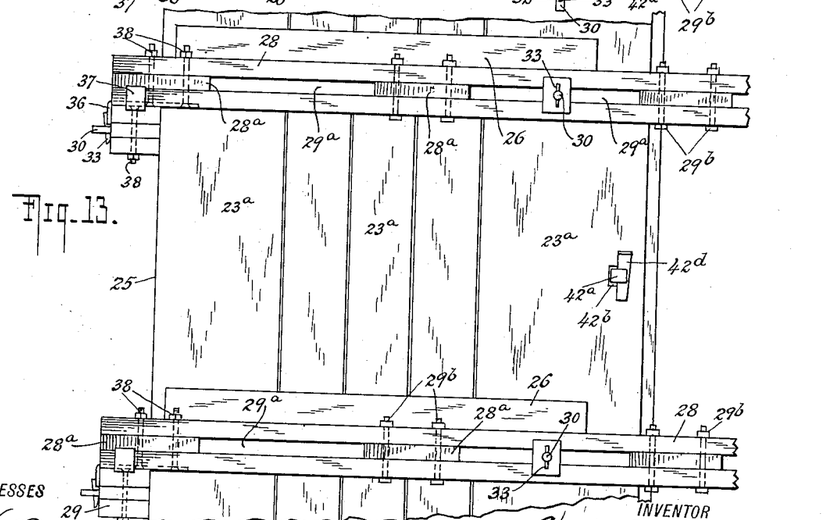
Fig. 13 is an exterior elevation thereof.
Figure 14:
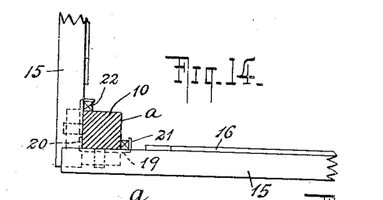
Figs. 14 and 15 are horizontal sections taken respectively on the lines 14—14 and 15—15 of Fig. 2.
Figure 15:
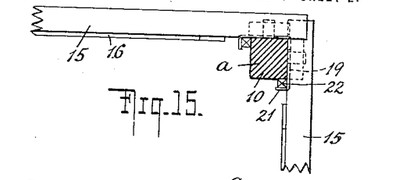

In the illustrated example the cross-pieces 26 of the outer forms 25 rest upon outside laterals or ribbons 28 and 29 which may comprise timbers of suitable dimensions simply drilled or formed with slots at spaced intervals for the accommodation of bolts or rods 30 or which may comprise a composite built-up member; thus, as shown in the illustrated example, the supports 28 and 29 may each consist of parallel members spaced apart by means of blocks or the like $28^a$ located at intervals between said members and forming slots $29^a$ for the accommodation of the bolts or rods 30 above referred to. The parallel members and the blocks $28^a$ may be connected together in any suitable manner to form rigid units, as, for instance, by means of nuts and bolts $29^b$, the latter passing through the parallel members and the blocks $28^a$. In the assembled condition of the apparatus the bolts or rods 30 pass through suitable openings in the truss laterals 15 of the trusses $c$ and inner forms 23 and through suitable openings in the outer forms 25 and either through suitable openings or through the slots $29^a$ of the laterals or ribbons 28 and 29 as shown in Fig. 13. By constructing the ribbons 28 and 29 in the form of composite members as shown and described the weakening effect which is due to drilling through a timber is avoided; the slots $29^a$ also provide amply for variations in the locations of the bolts 30 and do away with the necessity for careful drilling and positioning of the parts. The bolts or rods 30 are formed at their inner ends with heads 31 which engage the laterals 15 and at their outer ends are provided with openings 32 for the reception of wedges 33 whereby the bolts or rods are secured in position. In order to maintain the inner forms 23 and outer forms 25 in proper spaced relation to provide walls of the desired thickness, spacing sleeves 34 are provided, these sleeves, in the preferred arrangement surrounding the rods or bolts 30 and abutting against suitably shaped washers 35 preferably secured to and carried by the inner and outer mold forms respectively.

With the described arrangement, as the wedges 33 are driven home in the openings 32, the heads 31 of the bolts 30 will be drawn into firm engagement with the laterals 15 of the trusses $c$ and the inner forms 23, sleeves 34, washer 35 and outer forms 25 will be drawn together into rigid relation with each other. The inner and outer mold forms and their coöperating elements are thus rigidly and efficiently combined and supported upon the rigid truss structure formed by the uprights $a$ and $b$ and the trusses $c$.

Figure 20:
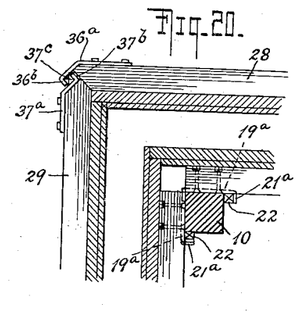
Figs. 20 and 21 are detail sectional views illustrating alternative arrangements which may be used in my apparatus.
Figure 21:
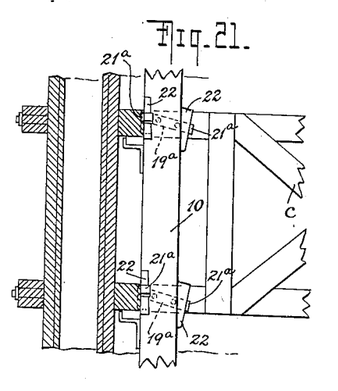

The ribbons 28 and 29 may be of such length and may be so located that the contiguous ends thereof rest upon and overlap each other as shown in Figs. 12 and 13; in order to increase the rigidity of the structure and to prevent unintentional displacement of the ribbons relatively to each other, said ribbons may be provided with angle irons 36 and 37, which are secured in position in any suitable manner as by bolts 38 so as to project beyond and at an angle to the ends of said ribbons as shown in Fig. 13. With this construction the angle irons 36 of the ribbons 28 extend over and into engagement with the ribbons 29, while the angle irons 37 of the ribbons 29 extend over and into engagement with the ribbons 28, said ribbons, at their contiguous ends, being thus securely held against relative displacement. Instead of overlapping as above described the ends of said ribbons 28 and 29 may abut against each other, as shown in Fig. 20; in this case the opposed ends are preferably mitered, as shown. Angle irons $36^a$ and $37^a$ corresponding to the angle irons 36 and 37 project beyond the ends of said ribbons 28 and 29 respectively, the irons $36^a$ and $37^a$ being formed with hooks $36^b$ and $37^b$ extending in directions parallel with the miter and spaced from each other as shown in Fig. 20. Wedges $37^c$ are driven between said hooks $36^b$ and $37^b$ and serve to draw the mitered ends of the laterals 28 and 29 into firm engagement with each other, and thus maintain said laterals securely against relative displacement.

An example of the arrangement and formation of the mold forms at the corners of the apparatus is shown in Figs. 12 and 13 of the drawings in which the method whereby the walls of the building are joined or cast at the corners is clearly illustrated; it will, of course, be understood that other equivalent arrangements may be used if desired. As shown, the arrangement comprises inner mold forms consisting of outer boards $23^c$ and inner boards $23^d$ similar to the boards $23^a$ and $23^b$ and similarly joined together in surface engagement with and extending transversely to each other; two panels formed by the boards $23^c$ and $23^d$ are connected together at right angles to each other to form a corner panel, the boards 23$^d$ extending beyond the boards 23$^c$ as shown in Fig. 12. These corner panels may be suspended from the trusses $c$ also by means of projections 24$^a$ corresponding to the projections 24; inner forms 23 of the kind hereinbefore described are located adjacent to the corner panel with the opposed edges of the outer boards 23$^a$ and 23$^c$ and of the inner boards 23$^b$ and 23$^d$ in close proximity to or in actual engagement with each other. To complete the mold at the corner, outer mold forms 25 are set up in positions transverse to each other, with the one edge of the outer boards of one form 25 in engagement with the surface of the outer boards of the other form 25, the inner boards of said forms 25 fitting together as shown in said Fig. 12. The method of supporting the outer forms 25 at the corners is the same as elsewhere throughout the structure.

At the points where it is intended to provide for windows in the finished building the mold forms may be arranged as shown in Figs 9, 10, 12 and 13. As illustrated, the complete window or the window casing alone, is set in position, with the casing 39 in engagement with the inner mold forms as indicated at 23$^e$ and with the laterals 15 of one of the trusses $c$. The casing 39 may be held in position during the casting operation in any suitable manner as, for instance, by providing suitable clamping members 40 located at the proper points on the inner mold forms 23 and on a lateral 15 of the proper truss $c$. These clamping members extend over the inner edges of the casing 39 in spaced relation thereto and thus provide spaces for the reception of wedges 41 which are driven between said members 40 and the casing 39 and serve to rigidly secure it in its proper position. In addition, the casing 39 may be provided at suitable points with blocks 42 rigidly secured to said casing as shown in Figs. 9, 11 and 12, and provided with hooks or angle irons 42$^a$ fixed to said blocks in any suitable and convenient manner. These hooks or angle irons 42$^a$ extend through suitable openings 42$^b$ in the outer mold forms 25 as shown in Figs. 11 and 12; at the top of the casing a board 42$^c$ extends transversely across the mold form 25 and is preferably countersunk therein, as shown in Fig. 9, said board being provided with openings registering with the openings 42$^b$ for the accommodation of the hooks 42$^a$. The latter project beyond the mold forms 25 and board 42$^c$ with their outer ends parallel to and spaced from the outer surfaces thereof, as illustrated in Figs. 11 and 12, and thus provide spaces for the reception of wedges 42$^d$ which are driven between the outer ends of the angle irons and the outer mold forms 25 or board 42$^c$ and thus serve to securely connect the parts in fixed relation to each other. The board 42$^c$ is provided for the purpose of increasing the rigidity of the structure and to facilitate the separation of the parts at the top of the casing in knocking down the apparatus.

It will be seen that, with the arrangements described, the window casing proper in which the sashes are located is securely fixed in position and yet is not directly subjected to any strain or stress whereby said sash may be disturbed as to form or otherwise distorted or injured. As illustrated in Fig. 9, the apparatus is preferably constructed at 43 so as to provide for the formation of window sills in the finished building.

Any suitable arrangement whereby this may be accomplished may be used; for instance, as shown in said Fig. 9 composite boards 43$^a$ may be interlocked with the upper ends of the proper outer forms 25 as indicated by way of example at 43$^b$ and detachably combined with the inner members 43$^c$ which are inwardly spaced from the boards 43$^a$ and overlap the upper ends of said outer forms 25 as shown in Fig. 9. The inner members 43$^c$ carry blocks 43$^d$ similar to the blocks 42 and located between said members 43$^c$ and the composite boards 43$^a$; angle irons or hooks 43$^e$, which may correspond to the angle irons 42$^a$, are secured to the blocks 43$^d$ and extend through suitable openings 43$^f$ in the composite boards 43$^a$. The angle irons 43$^e$ project beyond the boards 43$^a$ and may be provided with suitable openings for the reception of wedges 43$^g$ or constructed and arranged in the same manner as the hooks 42$^a$ to provide spaces for the accommodation of said wedges 43$^g$. In any case the latter serves to firmly clamp the inner members 43$^c$, composite boards 43$^a$ and the mold forms 25 together as is clearly shown in Fig. 9. As will be seen, this arrangement provides the projecting mold space hereinbefore referred to as 43 whereby the sill is produced. If desired, upright members 43$^h$ may be located in the surface engagement with the outer surface of the boards 43$^a$, said members 43$^h$ extending between laterals 28 and 29 nearest to the point at which the sill is to be formed. These members 43$^h$ may be secured in position and forced against said boards 43$^a$ by means of wedges 43$^k$ which are driven between said members 43$^h$ and lugs 43$^l$ fixed upon the laterals 28 and 29 at the proper points, as shown in Figs. 9 and 10. These members 43$^h$ and the wedges 43$^k$ with their coöperating parts thus provide an additional means whereby the boards 43$^a$ and inner members 43$^c$ are secured in position.

Such doors as are intended to be included in the finished building may be provided for in substantially the same way as the windows. It will be understood that the inner or outer mold forms 23 and 25 may be arranged so as to provide for the formation of chimneys and that in such case provision is also made in connection with the inner mold forms for the casting of connecting flues, fire places and the like.

Figure 5:
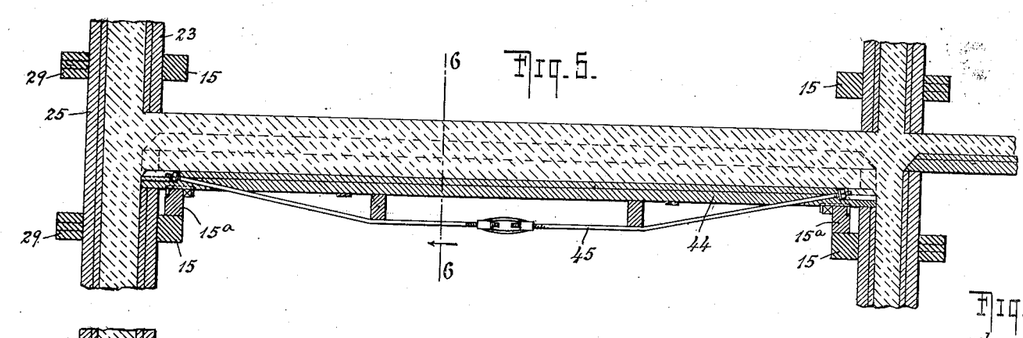
Fig. 5 is a detail section on the line 5—5 of Fig. 3.
Figure 6:
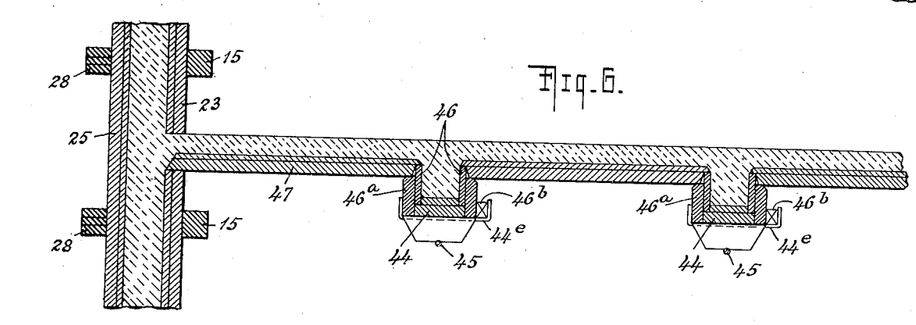
Fig. 6 is a similar view on the line 6—6 of Fig. 5.
Figure 7:
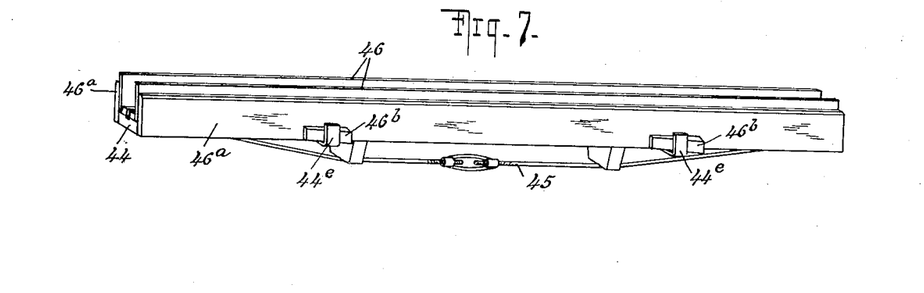
Fig. 7 is a perspective view of a portion of the floor and ceiling molds forming part of my apparatus.
Figure 8:
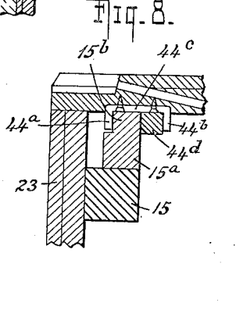
Fig. 8 is a detail sectional view.
Figure 22:
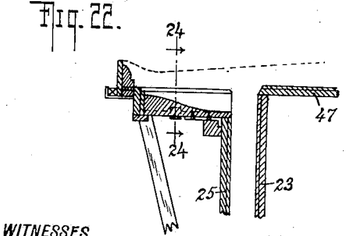
Fig. 22 is a detail section of the apparatus taken on the line 22—22 of Fig. 23 and illustrating an example of the arrangement whereby a roof cornice may be constructed.
Figure 23:
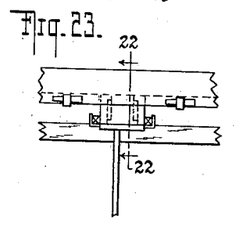
Fig. 23 is an elevation thereof and Fig. 24 is a detail section on the line 24—24 of Fig. 22.
Figure 24:
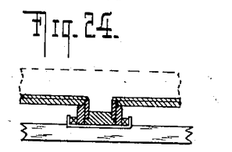

Interior or auxiliary trusses $d$, similar to the trusses $c$ may extend transversely between the opposite uprights $b$ and may be secured or supported thereon in the same way as the main trusses $c$ are supported upon the uprights $a$ and $b$. Soffit boards 44 preferably stiffened and reinforced by means of camber rods or stays 45 extend between the trusses at suitable points and are supported either directly upon the proper trusses or upon filler pieces $15^a$ made integral with or secured to the top laterals 15 of the proper trusses. In order to secure the soffit boards 44 in position and at the same time to stiffen and increase the rigidity of the entire structure against lateral distortion and "leaning," said boards are provided with downwardly extending lugs $44^a$ and $44^b$ which may form integral end portions of members $44^c$ secured upon said boards 44 at the proper points in any suitable or convenient manner. As shown in Figs. 5 and 8, the lugs $44^a$ are located behind and in engagement with blocks $15^b$ which may either be secured to or form parts of the proper trusses or as illustrated, form part of or be secured to the filler pieces $15^a$; the lugs $44^b$ in turn are spaced from the blocks $15^b$ to provide spaces for the accommodation of wedges $44^d$ which are driven between said lugs $44^b$ and the blocks $15^b$ and thus serve to securely bind the soffit boards 44 and the laterals 15 of the trusses together. The soffit boards 44 carry the haunch or side boards 46 which form molds whereby floor beams are cast; the haunch boards 46 are combined with outer boards $46^a$ which project over the edges of the soffit boards 44. The latter as shown are provided with clamps $44^e$ one end of which engages one of the boards $46^a$ and the other end of which is spaced from the other board $46^a$; wedges $46^b$ are driven between said other end of the clamps $44^e$ and said other board $46^a$ and thus clamp the side boards 46 and $46^a$ firmly upon the soffit boards 44, as shown in Figs. 6 and 7. Deck plates or floor boards 47 are in turn supported upon the boards $46^a$ and upon the inner mold forms 23, the latter being arranged for this purpose at the proper points; those edges of the deck plates 47 which are contiguous to the side boards 46 are preferably beveled as shown in Fig. 6 in order to reduce the danger of binding at these points and to facilitate the separation of the parts when knocking down the apparatus. The deck plates 47 are preferably mitered at their opposed edges so as to closely fit together, the miters being arranged as shown in Fig. 1 whereby the removal of the deck plates 47 at the proper time is made readily possible and the danger of binding is reduced to a minimum; at the proper points said deck plates are provided with openings 48 through which the uprights extend, said openings 48 being relatively larger than said uprights to provide annular spaces of material dimensions about the same, whereby the knocking down of the apparatus is facilitated, as will be more fully described hereinafter. In the preferred arrangement sleeves 49 are located on the deck plates 47 in registry with the openings 48 and surround the uprights $a$ and $b$ as shown in Fig. 2. The structure for molding the roof of the building may be arranged in the same way as the floors, it being understood that provision may be made for such cornices and other features as may be desired in the manner indicated in Figs. 22, 23, and 24, the arrangement being generally the same as that of the structures whereby the floors and ceilings are molded.

It will be understood that the inner mold forms 23 are so arranged with respect to the deck plates 47 for the floors and roof, that the coalescent material comprising the floors and roof may be poured coincidentally with the material forming the walls of the building.

Interior mold forms 50 and 51 may be combined with each other and supported upon the auxiliary trusses $d$ in the same way that the mold forms 23 and 25 are combined with each other and supported upon the main trusses $c$. These interior mold forms 50 and 51 provide molding spaces 52 and may be located and arranged as to provide for stair wells and the like and for the casting of such partitions as may be desired. It will be understood that provision is made, in the apparatus, for the uniting of the material forming one partition with that forming another partition or with the material forming the outer walls, whenever this is necessary or desired. Furthermore, suitable supplemental forms may be included in the apparatus whereby the casting of stairs, porches, piazzas, and other fixtures of concrete or other coalescent material may, if desired, be carried on coincidentally with or subsequently to the casting of the other parts of the building.

In erecting the apparatus for use, a concrete base, either in the form of individual column footings or in the form of a footing covering the entire area of the subsequent cellar and forming the floor thereof, is laid and allowed to set or harden. The blocks 13 are set upon this base in proper positions, one for each upright or column $a$ and $b$, after which the wedges 14 arranged in pairs, with the wedges of each pair in opposed relation to each other, are placed upon the blocks 13. The basement uprights 10 are then set upon said wedges in an upright position and connected together by the trusses *c* which are combined with the upright by placing the laterals 15 upon the angle rests or hooks 17 which fit over the blocks 18 and thus maintain said trusses *c* against lateral movement relatively to the uprights; after the trusses *c* have been properly located upon the hooks 17, the wedges 22 or 22$^a$ are driven between the end members 21 or 21$^a$ of the devices 19 or 19$^a$ and the uprights *a* and *b* to secure the trusses *c* against lengthwise movement relatively to said uprights. By adjusting the wedges 14, the tops of the uprights *a* and *b* may be brought to a common level so that the apparatus at this stage comprises a skeleton structure representing one story of the building and consisting of the uprights *a* and *b* and the trusses *c* with their coöperating parts, all of which are both level and in proper alinement. As this skeleton structure is efficiently trussed against thrust and other strains, all of the additional parts necessary to complete the portion of the apparatus under discussion may be combined therewith without requiring any further truing up, leveling, or plumbing thereof. As hereinbefore stated, the uprights *a* and *b* and the trusses *c* together form a truss structure in which all parts are fixed both in alinement and plumb and in which all the intended dimensions, particularly as to interior measurements, are automatically and efficiently carried out and maintained. As a matter of fact, each room of the house is defined by uprights and trusses which together form truss structures of absolute rigidity in all directions and against all strains and stresses. Distortion of the apparatus, "leaning" thereof, and any other deviation from the predetermined results, is thus absolutely avoided. While the truss unit is a single room, the entire building is also a truss structure and I have therefore, for convenience of description, treated the entire apparatus as constituting the main truss structure and referred to the interior truss work as constituting partitions.

The inside forms 23 may now be hung, by means of the cross-pieces or lugs 24, upon the laterals 15 of the trusses after which the spacing sleeves 34, outside forms 25 and laterals or ribbons 28 and 29 may be connected thereto by means of the bolts or rods 30 and wedges 33.

The soffit boards 44 and haunch boards 46, properly combined, are then set and secured in position and the floor decked in by placing the deck plates 47 in their intended positions. It will be seen that the entire load is carried by the laterals 15, and transmitted thereby, through the medium of the angle rests or hooks 17, to the uprights *a* and *b*; that is to say, the entire load, produced by the forms and the concrete or both is transmitted to the uprights *a* and *b* and not to the formwork of the inside and outside walls.

The relatively short sections 11 of the uprights are now placed upon the sections 10 thereof which are already in position upon the wedges 14, it being understood that said sections 11 extend upwardly through the openings 48 of the deck plates 47 and through the sleeve 49 carried thereby. Additional sections 10 are now placed upon the sections 11, the lugs 12 serving to maintain said sections in proper end to end alinement. Additional trusses *c* are now connected with the additional sections 10 in the same way as hereinbefore described and additional mold forms 23 and 25 with spacing sleeves 34 and washers 35 are combined with said trusses also as hereinbefore mentioned, this additional structure resulting in a skeleton second story complete.

This process of form erection is then repeated and carried further until the desired height and number of stories has been reached, the apparatus when completely set up, representing the complete house it is intended to build. It will, of course, be understood that such window casings, door casings and the like as it is intended to form part of the finished building are set up and combined with the structure at the proper time and in the proper places as hereinbefore set forth, and also that the auxiliary trusses *d* with their coöperating parts are placed in position at the proper time, in a manner similar to that described with respect to the main trusses *c* and connected elements. Furthermore, the forms for chimneys, for the roof and for cornices and the like, are also properly located as the setting up of the apparatus proceeds.

Any reinforcements for the concrete which it may be desired to incorporate, as well as such plumbing, wiring or other features which it is intended to include in the building, are now put in place in the troughs formed by the soffit and haunch boards 44 and 46, respectively, and in the mold spaces 27, thus avoiding the necessity for any subsequent drilling or the like. All furring, lath, etc., may be also placed in position and any other elements or features which it is intended to include may be added, so that at this stage everything required is in proper place and the interior is the exact intended shape of the building. The concrete or other coalescent material *e* is now introduced into the molding spaces 27 and 52 or, in other words, into the forms and permitted to set and harden, it being understood that in some cases the floors may be separately poured, concrete, in such cases, being taken through the windows or doors if necessary. In any case, the concrete or other coalescent material comprising the floors and which is placed upon the deck plates 47 and in the troughs formed by the soffit boards 44 and haunch boards 46, is manually leveled by means of suitable implements. During this leveling operation the upper laterals 15 of the nearest trusses c may be used as guides, by providing the leveling implement with suitable means arranged to ride along said laterals, as the leveling implement is manually manipulated. The desired level is thus automatically and uniformly provided with a minimum of effort and labor. The roof may be formed in the same way as the floors or it may be of gable, pyramidal or other desired shape, it being understood that the formwork is correspondingly arranged and that the leveling of the concrete is accordingly carried out. After the proper or desired degree of hardness has been attained, the concrete house is ready to be stripped of its temporary jackets, in other words, the molding apparatus. The sleeves 49 prevent the concrete from entering the openings 48 and prevent the upright sections 11 against becoming embedded in said concrete.

In taking down the forms, the first step is to remove the wedges 14 from beneath the uprights a and b, which may be readily accomplished by means of a suitable implement, such as a hammer. The removal of the wedges 14 permits the uprights a and b to drop a distance sufficient to disengage the angle rests 17 from the blocks 18 of the laterals 15 of the various trusses c and d, it being understood that the wedges 22 or 22$^a$, whereby the trusses are held against lengthwise movement, have also been previously removed. Owing to the fact that the upright sections 10 do not extend upwardly beyond any given floor, said section 10 may be readily removed, the trusses being held suspended by the bolts or rods 30. The short sections 11 of the uprights a and b may be readily withdrawn downwardly through the floor openings 48, the sleeves 49 having prevented the concrete from reaching these points; these short sections 11 usually stick in place until tapped with a hammer. By removing the wedges 33 or equivalent devices, the bolts or rods 30 may now be withdrawn, the spacing sleeves 34 which remain embedded in the concrete making this readily possible; after the bolts or rods 30 have been removed the ribbons or laterals 28 and the outer mold forms 25 are taken down. This operation is usually carried out by commencing at the top and working down a working scaffold 53, suitably supported upon the outside laterals 28 and 29 and maintained in position by braces 54, being used to facilitate this removal of the specified parts; the scaffold 53 may be used also in erecting the apparatus. The inner and outer mold forms 23 with the connected washers 35, are now free to be taken down, it being understood that the knock down operation, so far as the trusses and inner mold forms are concerned, may be started either at the top story or the bottom story of the building as desired. While the described methods of erecting the apparatus and taking it down have been found satisfactory and efficient, they do not represent the only methods whereby the same results may be accomplished. It is, therefore, to be understood that sequences of operation other than those described may be followed in erecting and taking down the apparatus, if desired.

The washers 35 serve to produce depressions in the concrete walls, in registry with the spacing sleeves 34, which, as before stated, remain embedded in the concrete; the depressions referred to are filled with concrete and facilitate the obliteration from view of the sleeves 34 and the completion of the inner and outer faces of the various walls as will be apparent. The openings which remain in the floors at the points at which the sections 11 of the uprights a and b were located, may be filled in with concrete to complete the floors, in any convenient manner.

It will be noted that with my apparatus the forms necessary to complete a house, including floors, ceilings, partitions, etc., may be readily and quickly set up complete, and once set up need no further adjustment or truing up. The complete house may thus be cast without interruption and without necessitating the shifting of any part of my apparatus, all parts of which remain in place until the casting operation has been entirely finished. The apparatus may then be quickly removed or knocked down, for instance, as has been described.

The elements which perform the supporting function are all located within the region that is subsequently inclosed between the walls, floors and ceilings of the finished building, whereby the rigidity and immovability of the truss structure is enabled to perform the function of positively and unvaryingly defining the inside configuration of the buildings. In this way every building will be exactly alike on the inside and irregularities, if such there be, are compelled to express themselves on the outside of the building where they are immaterial or capable of being subsequently corrected by the usual final outside covering of cement, stucco, or the like, with which concrete buildings are usually finished.

My improved apparatus makes it also possible to standardize all parts thereof so that the apparatus may be efficiently used for molding successively any number of buildings of a given type. Due to the fact that my apparatus produces absolute uniformity in the interior dimensions in the various buildings consecutively produced from the same supporting structure, it also becomes possible to standardize the building auxiliaries, such as plumbing, piping, electrical conduits, etc., so that instead of having to measure, cut and fit these auxiliaries on the premises, they may be ordered already finished as to size and dimensions and shipped in bulk without waste or necessity for expert labor which would otherwise have to be performed at or near the place of erection of the buildings. The construction is such that for decorations, under-cuts, etc., gelatin molds may be used wherever they may be appropriate or desired.

It will, of course, be understood that the apparatus may be adapted for buildings of any desired form or architecture by simply constructing the various elements in accordance with the plans.

While I have described my apparatus in connection with the casting of a house of several stories, it will be obvious that said apparatus is equally well adapted for the casting of a house having a single story and no cellar, such as garages. In such case a skeleton structure comprising the uprights $a$ and $b$, the trusses $c$, and the coöperating parts, may be set up on the ground or on a suitable foundation at the ground level; such skeleton structure would correspond to any one of the single floor skeletons of the multiple story building herein described.

Various changes in the specific form shown and described may be made within the scope of the claims without departing from the spirit of my invention.

I claim:

1. In an apparatus for constructing monolithic buildings the combination of a skeleton structure comprising in its entirety a rigid truss and mold forms spaced from each other to form molding spaces rigidly combined with said structure.

2. In an apparatus for constructing monolithic buildings, the combination of a skeleton structure comprising in its entirety a rigid truss, said structure being sub-divided with each sub-division forming a rigid truss complete in itself and mold forms spaced apart to form molding spaces rigidly combined with said structure.

3. In an apparatus for constructing monolithic buildings, supporting means comprising upright and lateral members detachably connected to form a skeleton truss rigid in every direction and inner and outer mold forms removably carried by said supporting means and forming molding spaces for the walls of the building.

4. In an apparatus for constructing monolithic buildings, supporting means comprising upright and lateral members detachably connected to form a skeleton truss rigid in every direction and located entirely within the area defined by the walls, floor and ceiling of a single story and inner and outer mold forms removably carried by said supporting means and forming molding spaces for the walls of the building.

5. In an apparatus for constructing monolithic buildings, the combination of relatively short supporting devices, a skeleton truss resting upon said supporting devices and mold-forms carried by said truss and forming molding spaces for the walls of the building.

6. In an apparatus for constructing monolithic buildings, a plurality of supporting means comprising upright and lateral members detachably connected together to form a plurality of skeleton trusses rigid in every direction, and located one above the other, each skeleton truss being located entirely within the area defined by the walls, floor and ceiling of a given floor, means interposed between said uprights whereby said skeleton trusses are supported upon each other, inner and outer mold forms removably carried by said skeleton trusses and forming molding spaces for the walls of the building.

7. In an apparatus for constructing monolithic buildings, the combination of relatively short supporting devices and skeleton trusses, arranged and resting alternately upon each other to define a building having a plurality of stories and mold forms carried by the trusses and forming mold spaces for the walls of the building.

8. In an apparatus for constructing monolithic buildings, a plurality of skeleton trusses arranged within and upon each other to define a building having a plurality of stories and a plurality of rooms on each story, mold forms carried by the trusses and forming mold spaces for the walls of the building and for the rooms thereof and deck-plates supported on said trusses for molding the floors and roof of said building.

9. An apparatus for constructing monolithic buildings comprising uprights, trusses connecting said uprights and removably carried thereby, said uprights and trusses together forming a skeleton truss, means comprising members and wedges coöperating with each other and with said uprights to secure said trusses against relative movement in the direction of their length, a pair of wedges located in opposed relation to each other beneath each upright whereby the skeleton truss is supported and whereby it may be leveled and alined, inner mold forms removably carried by said trusses, outer mold forms, and means for spacing said outer mold forms from said inner mold forms and for connecting them therewith and with said trusses.

10. An apparatus for constructing monolithic buildings comprising foundation blocks, a pair of wedges located in opposed relation to each other upon each block, relatively long uprights resting upon said wedges, relatively short uprights resting upon said longer uprights, relatively long uprights resting upon said shorter uprights, said longer uprights being located entirely between the floor and ceiling of a given story of the building and said shorter uprights being located at the floor levels thereof, means for maintaining said uprights in end to end registry with each other, hooks located at intervals along said longer uprights, trusses hung upon said hooks whereby said trusses are supported and said longer uprights are connected, said trusses and longer uprights together forming skeleton trusses, members carried by said trusses and extending over said longer uprights, wedges driven between said members and said longer uprights whereby the trusses are held against relative lengthwise movement, inner mold forms suspended upon said trusses in surface engagement therewith, outer mold forms, spacing sleeves whereby said mold forms are spaced apart to provide molding spaces, bolts passing through said trusses, inner mold forms, spacing sleeves and outer mold forms, wedges extending transversely through said bolts at their outer ends whereby said inner and outer mold forms are secured upon said trusses, soffit and haunch boards carried by said trusses and providing spaces for molding floor and roof beams and deck-plates supported on said haunch boards and inner mold forms for molding the floors and roof of the building.

11. An apparatus for constructing monolithic buildings comprising groups of inner and outer molding members, frames whereby one group of said members is supported and confined, additional frames joining each other whereby the other group of members is confined and supported and whereby the first mentioned frames and group of members is also supported and posts located at the joining points of said additional frames whereby the latter are supported, said posts constituting the sole support for the entire apparatus.

12. An apparatus for constructing monolithic buildings comprising upright corner posts, removable rests upon which said posts are located and molding means supported solely by said corner posts so as to be suspended thereby.

In testimony whereof I have hereunto set my hand.

HARVEY E. DODGE.